United States Patent [19]

Bernard

[11] Patent Number: 4,537,786

[45] Date of Patent: Aug. 27, 1985

[54] METHOD OF PREPARING LOW OIL FRIED POTATO CHIPS

[75] Inventor: Donald C. Bernard, Lewisville, Tex.

[73] Assignee: Frito-Lay, Inc., Dallas, Tex.

[21] Appl. No.: 558,360

[22] Filed: Dec. 5, 1983

[51] Int. Cl.$^3$ .............................................. A23L 1/216
[52] U.S. Cl. ..................................... 426/438; 426/465
[58] Field of Search ............... 426/637, 417, 438, 441, 426/443, 465, 472, 520, 808, 486

[56] References Cited

U.S. PATENT DOCUMENTS

| | | | |
|---|---|---|---|
| 1,265,236 | 5/1918 | Moore | 426/417 |
| 2,611,705 | 9/1952 | Hendel | 426/438 |
| 3,044,880 | 7/1962 | Bogyo et al. | |
| 3,338,724 | 8/1967 | Adler et al. | |
| 3,353,962 | 11/1967 | Smith, Jr. | |
| 3,402,049 | 9/1968 | Mancuso et al. | |
| 3,436,229 | 4/1969 | Simpson | |
| 3,627,535 | 12/1971 | Davidson et al. | 426/441 |
| 3,975,551 | 8/1976 | Shatila | 426/637 |
| 4,126,706 | 11/1978 | Hilton | 426/438 |
| 4,269,861 | 5/1981 | Caridis et al. | 426/438 |
| 4,277,510 | 7/1981 | Wicklund et al. | 426/441 |
| 4,325,295 | 5/1982 | Caridis et al. | |

FOREIGN PATENT DOCUMENTS

| | | | |
|---|---|---|---|
| 900266 | 5/1972 | Canada | 426/438 |
| 957896 | 11/1974 | Canada | 426/417 |
| 1034035 | 6/1966 | United Kingdom. | |
| 1133929 | 11/1968 | United Kingdom. | |
| 1519049 | 7/1978 | United Kingdom. | |

OTHER PUBLICATIONS

Shaw et al, "Reducing the Oil Content of Potato Chips by Controlling Their Temperature After Frying", USDA, 5-1968, pp. 1-9, 426-438.

*Primary Examiner*—Arthur L. Corbin
*Attorney, Agent, or Firm*—Bernard, Rothwell & Brown

[57] ABSTRACT

In a process of manufacturing low oil fried potato chips, potato slices are fried in oil or fat at a temperature of from about 280° F. to about 320° F., and removed from the oil or fat when the moisture content of the potato pieces is from about 3% to about 15% by weight. The fried potato slices are then contacted with an oil-removing blast of hot air at a temperature of from about 250° F. to about 350° F. for from about 1 to about 10 minutes until the moisture content of the fried potato product is reduced to about 2% by weight. The low temperature frying and blast of hot air reduces the oil content of the final product.

10 Claims, No Drawings

METHOD OF PREPARING LOW OIL FRIED POTATO CHIPS

BACKGROUND OF THE INVENTION

1. Field of the Invention

The present invention relates to a process for producing low oil fried potato chips and products thereof.

2. Description of the Background Art

Fried potato products having a low amount of residual moisture, such as potato chips made from potato slices, are popular snack items. Conventionally prepared potato chips are generally fried in oil or fat at a temperature of between about 350° F. to about 380° F. until the moisture content of the product is about 2% by weight. Such high oil frying temperatures are used since lowered oil temperatures usually result in greater oil uptake by the potato pieces which is generally undesirable.

Fried potato chips prepared using conventional methods usually have an oil or fat content of from about 36% to about 40% by weight. Consumers generally prefer the texture and flavor of a relatively lower fat content chip over a higher fat content product.

There is also a significant consumer interest in weight control and reduced intake of fats and oils. Because of the high fat or oil content of conventionally prepared potato chips, a substantial portion of the total calories therein present derives from the fat or oil in the product.

Numerous workers in the art have attempted various ways of reducing the amount of oil in potato chips. For example, British Patent Specification No. 1,133,929 describes a method of making potato chips by frying potato slices at about 300° F. to a relatively high moisture content, and drying the chips in dry air at subatmospheric pressure. U.S. Pat. No. 3,353,962 discloses another method involving frying slices at conventional temperatures to a relatively high moisture content and drying the slices with radiant energy. British Patent Specification No. 1,034,035 describes still another method involving frying potato slices at conventional temperatures to a relatively high moisture content, and drying the chips in a layer with hot air moving upwards through the layer at low velocity. A publicly available thesis describes several methods of frying potato chips, including vacuum drying of the chips. Baroudi, A., *Evaluation of Factors Affecting Color and Acceptance of Potato Chips*, Ohio State University (1978).

There remains, however, a need for an economical and efficient method of producing low oil potato chips.

SUMMARY OF THE INVENTION

In accordance with the present invention, a process for producing low oil potato chips comprises frying potato slices in edible oil or fat at a temperature of from about 280° F. to about 320° F. (which is well below the normal frying temperature of about 350°–380° F.), removing the potato chips from said edible oil or fat when the potato chips have a moisture content of from about 3% to about 15% by weight, and contacting the removed potato chips for from about 1 to about 10 minutes with a forced stream of air within about 10 seconds after the potato pieces are fried, the air being pre-heated to a temperature of from about 250° F. to about 350° F. This produces potato chips having a moisture content of about 2% by weight and an oil content below that of conventionally prepared potato chips.

DESCRIPTION OF THE PREFERRED EMBODIMENT

According to the process of the present invention, low oil fried potato products are manufactured using slices of whole potatoes. The whole potatoes may be of any suitable variety as are commonly used to make fried potato chips or strips, such as Minona, Kennebec, Atlantic, F-L 162, and the like. Whole potatoes are initially washed to remove the dirt and then peeled or left unpeeled. The potatoes are then sliced as is typical in potato chip manufacture.

The potato slices may then optionally be washed using conventional methods, e.g., with water jets or in water sluices, to remove loose particles of potato which may be formed during the cutting process. Alternatively, the slices may be washed in a salt brine to improve the potato properties as is described in commonly owned U.S. patent application Ser. No. 379,941, filed May 19, 1982, now abandoned.

The potato slices may have flat surfaces surfaces may be textured (e.g., rippled) as is well known in the art. The potato slices are preferably slightly thicker than those utilized in conventional processes. The preferred thickness range is from about 0.07 inch to about 0.08 inch. Normally, potato chips are made from slices between 0.05 and 0.07 inch in thickness. It has, however, been discovered that thicker slicing contributes to the reduced oil content of potato chips produced according to the present invention. Potato slices of from about 0.073 to about 0.075 inch in thickness are particularly preferred.

The potato slices are fried in edible oil or fat at temperatures which are below those of conventional methods. Although low temperature frying initially results in potato chips of higher than normal oil content, it has been discovered that surprisingly, low temperature frying combined with subjecting the chips to a post-fry blowoff with a blast of hot air (hereinafter described) results in a final product of lower oil content than conventional chips.

The low temperature frying may be done isothermally, or with a temperature profile decrease. While conventional potato chip frying temperatures are generally in the range of from about 350° F. to about 380° F., the process of the present invention utilizes frying temperatures of from about 280° F. to about 320° F. The frying is discontinued when the moisture content of the potato slices are reduced to within the range of from about 3% to about 15% by weight, preferably in the range of from about 5% to about 10% by weight. This is much more moisture than remains in chips following the conventional methods of high temperature frying.

The potato chips are then removed from the hot oil and an oil-removing blast of hot air at a temperature of from about 250° F. to about 350° F. is directed onto the potato chips for from about 1 to about 10 minutes and within about 10 seconds after removal of the chips from the oil. It is particularly preferred that the hot air be at a temperature of from about 290° F. to about 310° F., with an air temperature of about 300° F. being most preferred. It is preferred that the potato chips be subjected to the hot air blast as soon as possible after removal of the chips from the oil and that the pressure of the hot air blast be from about 0.15 to about 0.3 inches of water. A particularly preferred pressure range for the hot air blast is between about 0.18 and about 0.28 inches of water, with a pressure of 0.28 inches of water being most preferred. It is also preferred that during the hot air blast, the potato chips be supported by a porous structure and that the hot air be directed onto the potato chips from above and drawn away by suction from below. This facilitates removal of the oil from the surface of the potato chips. This post-fry blowoff step reduces the moisture content of the chips to about 2% by weight. It is particularly preferred that the chips be subjected to the hot air blast for from about 2 to about 4 minutes. The negative pressure of the suction is preferably from about 1.2 to about 1.8 inches of water. A particularly preferred negative pressure of the suction is within the range of from about 1.4 to about 1.6 inches of water, with a negative pressure of 1.6 inches of water being most preferred.

It is particularly preferred that the chips be removed from the frying oil with a maximum vertical orientation, e.g., by a porous conveyor system attached to the outer surface of which are a plurality of vertical spikes which orient the chips on edge as they are removed from the oil. The chips are then immediately subjected to the blast of hot air at a temperature of about 300° F. for from about two to about 4 minutes.

After removal of oil by the post-fry blowoff, the potato chips may be tumbled with salt and/or other flavorings and then packaged suitably for marketing, all as is well known in the art.

The present invention produces fried potato chips having a reduced oil content, compared to similar products prepared using conventional methods. The invention produces potato chips having an oil content in the range of from about 18% to about 25% by weight, as compared to conventional chips having an oil content of from about 36% to about 40% by weight. Low temperature frying initially adds more oil to the potato slices than would higher temperature frying, but a larger percentage of oil is blown off of potato chips fried at lower temperatures than those fried at conventional temperatures using the present method. This may, perhaps, be due to a greater concentration of oil at or near the surface of the low temperature fried chips. Removal of the potato chips from the frying oil while they still contain a higher than normal moisture content serves to further reduce oil absorption by the potato chip. The high temperature of the hot air blast reduces the moisture content of the potato chips and facilitates blow-off of the oil by maintaining high oil fluidity. Suction from below the potato chips draws the oil away as it is blown off.

When potato chips are produced according to the present invention, thicker than normal slicing also reduces oil uptake by the potato slice. Maximal vertical orientation of the chips promotes oil drainage from the chips as they are removed from the frying oil, as well as during the hot air oil blow-off.

The invention is further illustrated by the following examples, which are not intended to be limiting.

EXAMPLE I

Four batches of Kennebec potatoes were washed, peeled and conventionally thin-sliced (0.055 inch thickness). Each batch of slices was spray washed by water jets for about 1 second before entering the fryer. Test conditions and results are indicated in Table 1 below.

TABLE 1

|  | Without Blowoff % oil at 1.5% $H_2O$ | With Blowoff % oil at 1.5% $H_2O$ |
|---|---|---|
| Low temperature fry (310° F.) | 42.3% | 29.2% |
| Normal fry (365° F.) | 37.5% | 31.2% |

This example demonstrates that low temperature frying actually increases oil content while at the same time dramatically improving post-fry blowoff performance. Chips fried at 310° F. were initially much higher in oil content than those fried at normal temperatures (365° F.). However, when post-fry blowoff was added, the low temperature samples were lower in oil content than the normal samples with or without blowoff.

EXAMPLE II

Four batches of thin-sliced potatoes (0.055 inch) were prepared as in Example I. Samples were fried at low and normal temperatures and analyzed before and after the post-fry blowoff procedure. Test conditions and results are indicated in Table 2 below.

TABLE 2

|  | Before Blowoff | | After Blowoff | |
|---|---|---|---|---|
|  | Oil | $H_2O$ | Oil | $H_2O$ |
| Low temperature fry (310° F.) | 38.7 | 8.97 | 29.0 | 2.32 |
| Normal fry (365° F.) | 34.8 | 10.6 | 31.1 | 1.73 |

This example demonstrates the dramatic results obtained with the combination of low temperature frying and post-fry blowoff. While conventional frying temperatures with post-fry blowoff only reduced the oil content of the chips by 3.7%, the combination of low temperature frying and post-fry blowoff reduced the oil content of the chips by 9.7%.

EXAMPLE III

Kennebec potatoes were washed, peeled and thick sliced at 0.074 inch thickness. The slices were spray washed by water jets for about 1 second before entering the fryer. The potato slices were fried in hot cottonseed oil at a temperature of about 300° F. for 4 minutes 10 seconds with a 20° F. temperature drop. The potato chips were removed from the oil at about 10% moisture content by a spiked porous conveyor system which maintained the chips in a maximum vertical orientation. The chips were then immediately subjected to a blast of hot air at a temperature of about 300° F. for three minutes thirty seconds, suction being applied from below the chips to remove the hot air and oil. The potato chips were tumbled with salt and packaged after being cooled. The chips had an average oil content of 22.8% by weight and an average moisture content of 2.08% by weight.

What is claimed is:

1. A process for producing low oil content fried potato chips comprising; frying potato slices in edible oil at a temperature of from about 280° F. to about 320° F., removing said potato slices from said edible oil when said potato slices have a moisture content of from about 3% to about 15% by weight, orienting said potato slices on-edge and contacting the fried potato slices for from about 1 to about 10 minutes with an oil-removing forced stream of air within about 10 seconds after said potato slices are fried and while said potato slices are oriented on-edge, said air being preheated to a temperature of from about 250° F. to about 350° F.

2. The process according to claim 1 further comprising; supporting the fried potato slices by a porous structure, directing said forced stream of air onto said fried potato slices from above at a pressure within the range of from about 0.15 to about 0.3 inches of water, and drawing said forced stream of air away from said fried potato slices by suction from below the slices at a negative pressure within the range of from about 1.2 to about 1.8 inches of water, wherein the fried potato slices are oriented on edge on said porous structure.

3. The process of claim 2 wherein said forced stream of air is at a pressure within the range of from about 0.18 to about 0.28 inches of water, and said suction is at a negative pressure within the range of from about 1.4 to about 1.6 inches of water.

4. The process of claim 3 wherin said forced stream of air is at a temperature of from about 290° F. to about 310° F.

5. The process of claim 4 wherein said fried potato slices contain from about 5% to about 10% moisture by weight prior to being contacted with said forced stream of air.

6. The process of claim 5 wherein said fried potato slices are contacted with said forced stream of air for from about two to about four minutes.

7. The process of claim 6 wherein said potato slices are from about 0.07 to about 0.08 inch in thickness before being fried.

8. The process of claim 7 wherein contact between said fried potato product and said forced stream of air is terminated when the moisture content of said fried potato product is about 2% by weight.

9. The process of claim 8 wherein said forced stream of air is at a pressure of about 0.28 inches of water, and said suction is at a negative pressure of about 1.6 inches of water.

10. A process for producing a fried potato chip with a relatively low oil content, using the steps of slicing potatoes, washing the slices, and frying the slices in edible oil, with the improvments comprising; utilizing a lower than normal frying temperature of about 280° F.-320° F. for the frying step, terminating the frying step when the potato slices have a moisture content of 3% to 15% by weight, orienting the potato slices on edge on a porous structure and subjecting the fried chips to a post-fry oil blow-off, while said potato slices are oriented on edge, utilizing an oil-removing forced stream of hot air at a temperature of about 250° F. to 350° F. until the moisture content of the chips is reduced to about 2% by weight and the oil content is reduced to about 18% to 25% by weight.

* * * * *